Figure 1:
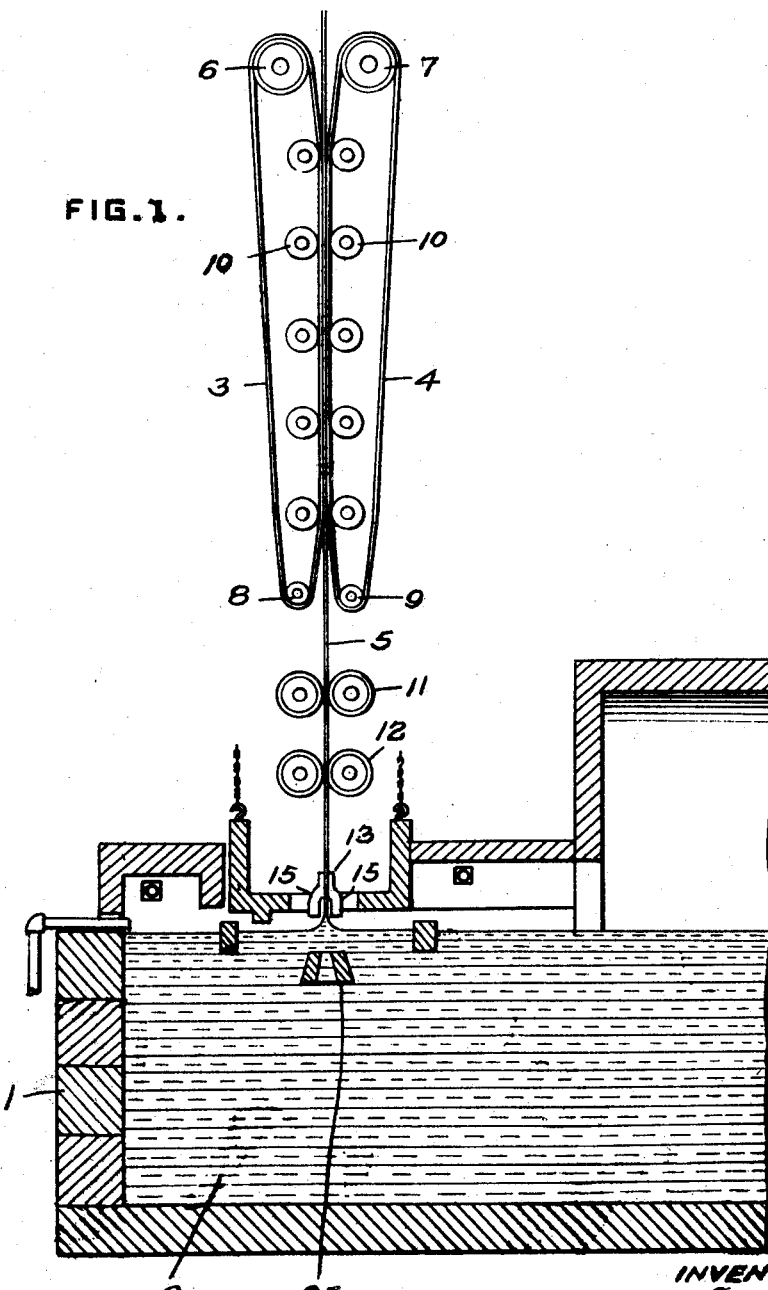

Aug. 7, 1928.  
H. G. SLINGLUFF  
1,679,504  
EDGE HOLDING DEVICE FOR SHEET GLASS MACHINES  
Filed March 26, 1923     3 Sheets-Sheet 1

INVENTOR  
H. G. Slingluff  
by  
James C. Bradley  
atty.

Aug. 7, 1928.  H. G. SLINGLUFF  1,679,504
EDGE HOLDING DEVICE FOR SHEET GLASS MACHINES
Filed March 26, 1923   3 Sheets-Sheet 2
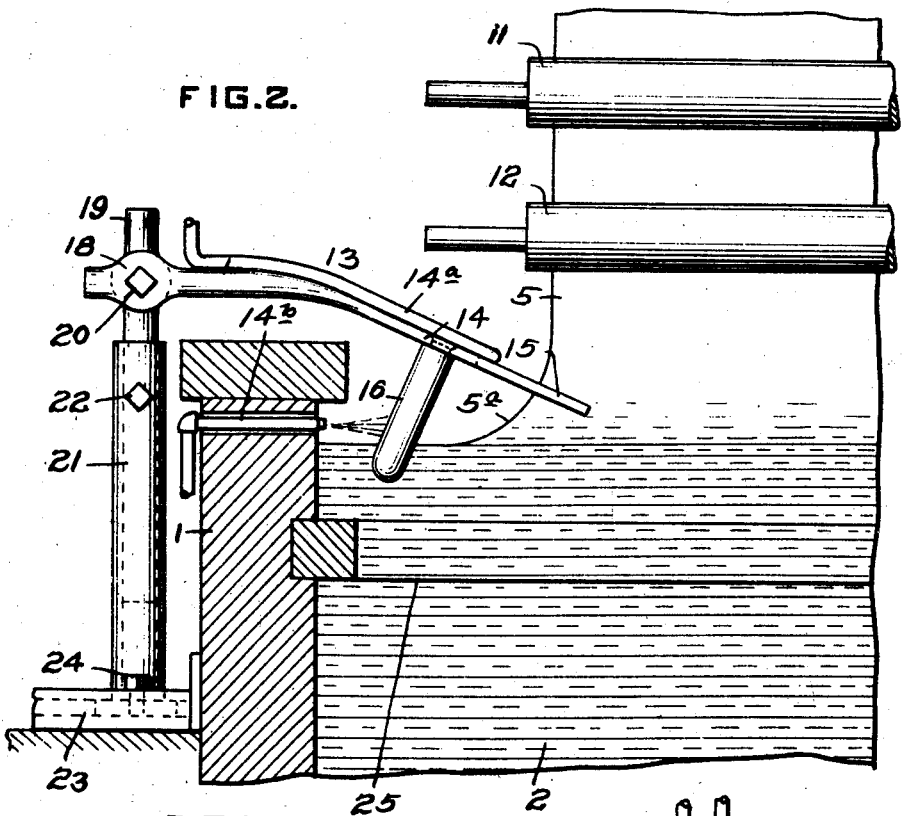
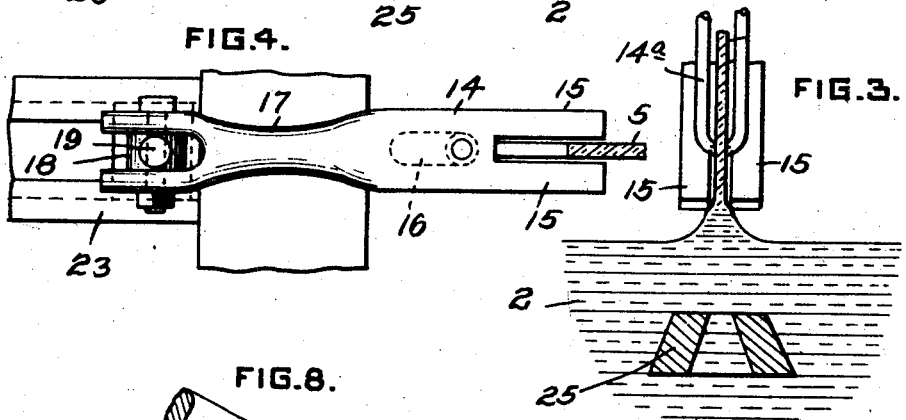
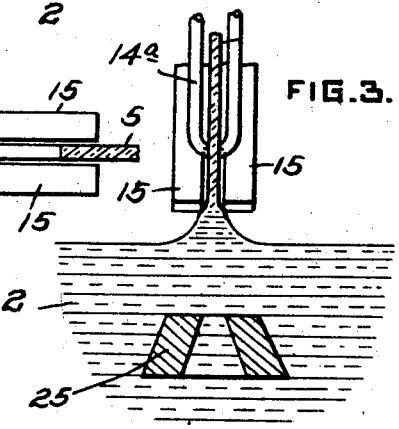
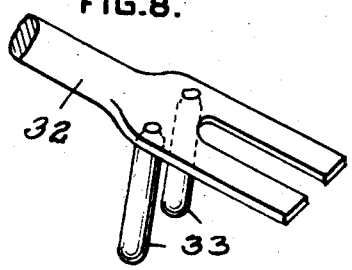
INVENTOR
H. G. Slingluff
by
James C. Bradley
Atty.

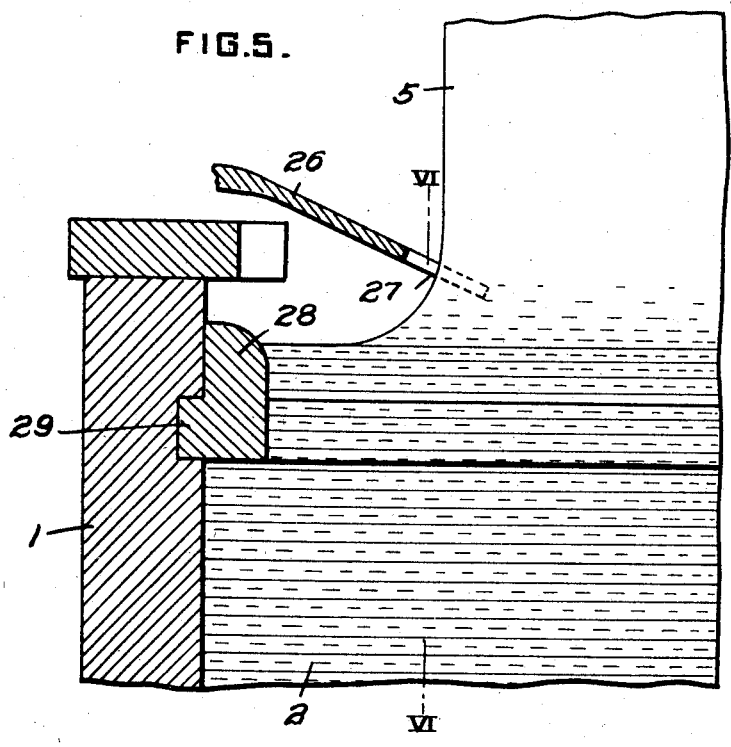
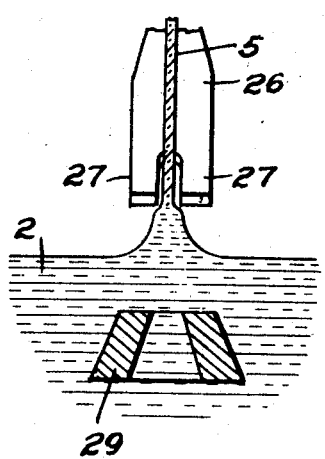
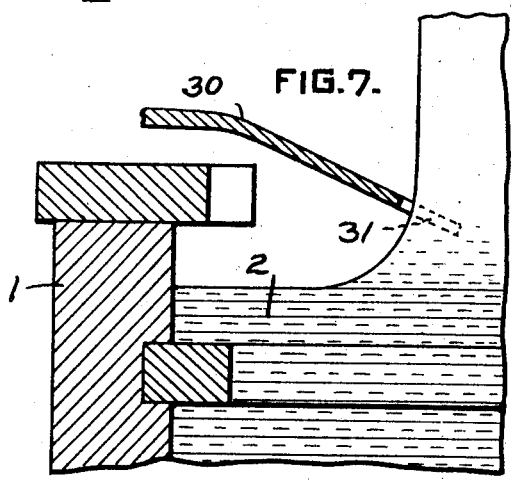

Patented Aug. 7, 1928.

1,679,504

UNITED STATES PATENT OFFICE.

HARRY G. SLINGLUFF, OF MOUNT VERNON, OHIO, ASSIGNOR TO PITTSBURGH PLATE GLASS COMPANY, A CORPORATION OF PENNSYLVANIA.

EDGE-HOLDING DEVICE FOR SHEET-GLASS MACHINES.

Application filed March 26, 1923. Serial No. 627,675.

The invention relates to apparatus for use with a sheet drawing machine, and has for its object the provision of an improved means and simplified for preventing the edges of the sheet of glass being drawn from moving inward during the drawing operation and thus gradually reducing the width of the sheet. Certain embodiments of the invention are illustrated in the accompanying drawings wherein:

Figure 1 is a diagrammatic side elevation showing the drawing apparatus with which the edge holding device is preferably used, such drawing apparatus being shown in my pending application, Serial No. 621,184. Fig. 2 is a transverse section through one side of a drawing tank showing the edge holding device in side elevation. Fig. 3 is a vertical section on the line III—III of Fig. 2. Fig. 4 is a plan view of the end of the tool. Fig. 5 is a view similar to that of Fig. 1 showing a modification. Fig. 6 is a section on the line VI—VI of Fig. 5. Fig. 7 is a fragmentary view similar to that of Figs. 2 and 5 showing a further modification. And Fig. 8 is a perspective view of a modification.

1 is the drawing tank or extension carrying a molten bath of glass 2 in communication with a suitable melting tank, not shown; 3 and 4 are endless belts, preferably of asbestos fabric for continuously drawing the sheet of glass 5 from the molten bath; 6 and 7 are the driving pulleys for the belts, such belts being driven from a suitable motor, not shown; 8 and 9 are solid steel bars circular in cross section lying in the lower ends of the belts and serving by reason of their weight to hold the belts in tension; 10 are a series of rolls back of the inner flights of the belts for pressing the belts against the glass, such rolls being yieldingly held inward by means of springs or weights, not shown; 11 and 12 are pairs of driven rolls covered with asbestos for assisting in the pulling of the sheet; and 13 is one of the edge holding devices to which the present invention is particularly directed, it being understood that such edge holding devices may be used in connection with any form of drawing mechanism, although the one as briefly illustrated and described is preferred.

It will be understood that an edge holding device such as that shown in Fig. 2 is applied at each side of the sheet, but for brevity of description and illustration only one of such devices is shown. The device in its preferred form consists of a plate 14 formed at its two ends into the fingers 15 and a finger or post 16 which projects downwardly into the glass as indicated in Fig. 2. The plate 14 merges, at its rear portion, into a round relatively stiff stem 17 flattened at its end as indicated at 18 and clamped to the vertical rod 19 by means of the bolt 20. The bar 19 is mounted for vertical adjustment in the standard 21 and is held in adjusted position by means of a set screw 22. This standard has its lower end mounted for lateral adjustment in the base plate 23, being held in position by means of the set screw 24. The adjustments including the swinging movement of the stem 17 about the bolt 20, the vertical movement of the rod 19 in the standard 21, and the in and out movement of the standard 21 in its base 23, permit the fingers 15 and the post 16 to be set at any desired position depending upon conditions.

The fingers 15 are spaced apart as indicated in Fig. 3 so that their inner edges engage the sides of the tapering portion of the sheet and tend to thin the edge as it is drawn upward through the fingers. This stripping action tends to prevent the edge of the sheet from becoming too thick and at the same time exerts a holding effect upon the edge tending to prevent it from working inward towards the center line of the sheet. This action of the fingers in tending to prevent the inward movement of the sheet is supplemented by the action of the post 16, which post sticks into the glass at the base 5ª of the sheet and tends to anchor the sheet at this point against inward movement. Before positioning the tool with the post 16 in the glass, such post is preferably heated so that an immediate adherence of the glass thereto is secured. To prevent the fingers from becoming too hot so that the glass adheres thereto, cooling means of various kinds may be employed. A water cooled pipe 14ª mounted upon the plate 14 is shown for accomplishing this function. In order to prevent undue chilling of the glass by the pin 16, a small burner 14ᵇ, may be employed extending through the wall 1 so as to direct its flame on the pin. Immediately under the center line of the sheet is the slotted guiding bar 25 of clay, which bar is preferably employed, but constitutes no part of the present invention.

Figs. 5 and 6 illustrate a modification in which the plate 26 provided with fingers 27 corresponds in construction and function with the parts 14 and 15 of the Fig. 2 construction, the plate also being similarly supported for adjustment. In this construction, however, the post or pin 16 of Fig. 2 is omitted and in place thereof, the projection 28 on the clay guide bar is substituted. This projection is brought up to or adjacent the surface of the glass and the base of the sheet becomes anchored thereto, thus tending to prevent inward movement of the edge of the sheet in the same manner as the post 16 of Fig. 2 prevents inward movement.

Fig. 7 illustrates still another modification in which the plate 30 with its fingers 31 is supported in the same manner as the plate 14 of Fig. 2 and performs the same functions, but in this construction, no means are provided for anchoring the edge of the sheet other than the side wall of the furnace to which the surface skin of the glass adheres adjacent the base of the sheet and tends to prevent inward movement of the edge.

Fig. 8 illustrates a further modification of the Fig. 2 construction in which the plate 32 corresponding to the plate 14 of Fig. 2 is provided with two anchoring pins 33 instead of the single pin 16 of Fig. 2, the edge of the glass sheet being anchored at its base between such pins. It is not necessary that the anchoring pins in either construction should be carried by the plates 14 and 32, but this is the simplest arrangement.

What I claim is:

1. In combination with apparatus for drawing a glass sheet from an open pool of molten glass, means for preventing inward movement of the edge of the sheet comprising a pair of fingers spaced apart and fixed against relative movement adjacent the base of the sheet just above the surface of the bath so that they straddle said edge and thin it as the edge moves upward therethrough.

2. In combination with apparatus for drawing a glass sheet from an open pool of molten glass, means for preventing inward movement of the edge of the sheet comprising a pair of fingers spaced apart and fixed against relative movement adjacent the base of the sheet so that they straddle said edge and thin it as the edge moves upward therethrough, and anchoring means in the glass bath at the edge of the sheet.

3. In combination with apparatus for drawing a glass sheet from an open pool of molten glass, a device for preventing inward movement of the edge of the sheet comprising a post projecting downward into the glass bath at the edge of the sheet and a pair of fingers spaced apart adjacent the base of the sheet so as to straddle such edge and thin it as the edge is drawn upward therethrough and fixed against relative movement, and means for securing the device in fixed position.

4. In glass drawing apparatus including a draw-pot having a source of molten glass therein, a refractory block having spaced downwardly extending lip portions to form a slot through which the border portions of the sheet being drawn passes for partially lowering the temperature and to create a dragging action at the border portions of the sheet for maintaining the desired width of sheet, and means for regulating the refractory block to increase or decrease the dragging action.

In testimony whereof, I have hereunto subscribed my name this 21st day of March, 1923.

HARRY G. SLINGLUFF.